June 19, 1923.　　　　　　　　　　　　　　　　　　　　1,459,509
P. J. KNOTHE
CUP PACKING FOR PUMPS AND THE LIKE
Filed Oct. 24, 1921

INVENTOR
Paul J. Knothe
BY Elwin M. Hulse
ATTORNEY

Patented June 19, 1923.

1,459,509

UNITED STATES PATENT OFFICE.

PAUL J. KNOTHE, OF FORT WAYNE, INDIANA, ASSIGNOR TO MONTPELIER MANUFACTURING COMPANY, OF MONTPELIER, INDIANA, A CORPORATION.

CUP PACKING FOR PUMPS AND THE LIKE.

Application filed October 24, 1921. Serial No. 509,829.

*To all whom it may concern:*

Be it known that I, PAUL J. KNOTHE, a citizen of the United States, residing at Fort Wayne, in the county of Allen and State of Indiana, have invented new and useful Improvements in Cup Packings for Pumps and the like, of which the following is a specification.

The invention relates to cup packings for pumps, well plungers and the like, and the object of the invention is to construct a cup of the form ordinarily used in pump plungers that it shall have long life and replacement of the same on account of wear will be less frequent than heretofore, and a further object is to construct and provide a cup that will resist pressure and abrasion and yet expand so as to retain its effectiveness until worn out.

In the accompanying drawings I have illustrated an exemplification of the invention by which its objects are accomplished and in which drawings—

Figure 1:
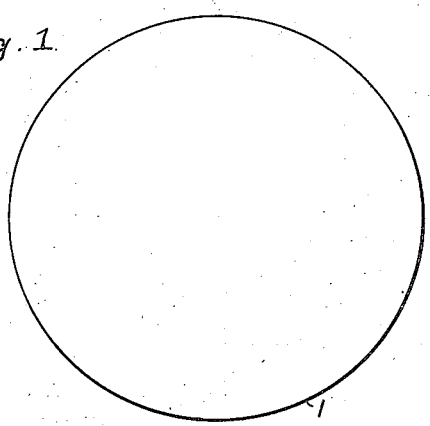
Figure 3:
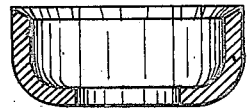
Figure 4:
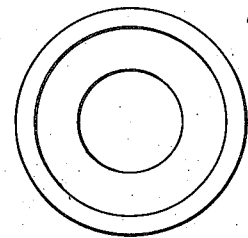
Figure 2:
Figure 5:
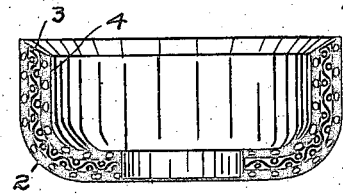

Figure 1 is a plan view of the disk from which the cup is formed; Fig. 2 a central cross-sectional view of the disk; Fig. 3 a central vertical cross-section of the cup; Fig. 4 a plan view of the same and Fig. 5 an exaggerated cross-sectional view of the cup showing the different layers of material.

Referring to the drawings, the cup is formed from a disk 1 composed of a bottom layer or layers or portion 2 of suitable fabric, such as duck, canvas or the like, impregnated or coated with rubber or a suitable rubber compound, an intermediate portion or layer or layers of fabric 3 which may or may not be coated or impregnated with a suitable adhesive or viscous material other than rubber such as shellac, and a top portion or layer or layers of rubber coated or impregnated fabric 4. The several layers may be stitched or sewed together. The disk thus formed is then pressed into the desired shape of the cup and then cured by subjecting it to heat of suitable degree. It is then trimmed up or finished to the shape shown in Figure 3.

The top layer or layers of rubberized fabric 4 may be omitted, in which case the finished cup will have the outer face formed by the rubberized fabric and the inner face formed by the expansive fabric layers 3 or by the untreated fabric.

The cup thus formed is relatively hard on its outer face which resists wear and cutting by sand and grit, while the portion of the cup formed by the untreated fabric or by the fabric treated with adhesive or viscous material other than rubber, is free to expand to cause the outer portion to expand and take up the wear on the cup, thus increasing or prolonging the life of the cup very materially.

What I claim is:

1. A cup packing formed of a plurality of layers of rubberized fabric and intermediate layers of fabric coated with an adhesive or viscous material other than rubber.

2. A vulcanized cup packing formed of outer and inner layers of rubberized fabric and intermediate layers of a fabric treated with an adhesive or viscous material other than rubber.

3. A vulcanized cup packing formed of outer and inner layers of rubberized fabric and intermediate layers of fabric treated with shellac.

4. A vulcanized cup packing formed of a plurality of layers of fabric, a portion of said layers being rubberized and another portion being treated with shellac.

In witness whereof I have hereunto subscribed my name this 21st day of October, 1921.

PAUL J. KNOTHE.